United States Patent
Andrews et al.

(10) Patent No.: US 10,949,540 B2
(45) Date of Patent: Mar. 16, 2021

(54) SECURITY POLICY ENFORCEMENT BASED ON DYNAMIC SECURITY CONTEXT UPDATES

(71) Applicant: DELL PRODUCTS L.P., Round Rock, TX (US)

(72) Inventors: Carlton A. Andrews, Austin, TX (US); Charles D. Robison, Buford, GA (US); Andrew T. Fausak, Coppell, TX (US); David Konetski, Austin, TX (US); Girish S. Dhoble, Austin, TX (US); Ricardo L. Martinez, Leander, TX (US); Joseph Kozlowski, Hutto, TX (US)

(73) Assignee: Dell Products L.P., Round Rock, TX (US)

( * ) Notice: Subject to any disclaimer, the term of this patent is extended or adjusted under 35 U.S.C. 154(b) by 220 days.

(21) Appl. No.: 15/926,551

(22) Filed: Mar. 20, 2018

(65) Prior Publication Data
US 2019/0294800 A1    Sep. 26, 2019

(51) Int. Cl.
G06F 21/57    (2013.01)
G06F 21/64    (2013.01)
G06F 21/60    (2013.01)

(52) U.S. Cl.
CPC .......... *G06F 21/577* (2013.01); *G06F 21/602* (2013.01); *G06F 21/64* (2013.01)

(58) Field of Classification Search
CPC ....... G06F 21/577; G06F 21/64; G06F 21/602
USPC .......................................................... 726/25
See application file for complete search history.

(56) References Cited

U.S. PATENT DOCUMENTS

| 9,038,130 | B2 | 5/2015 | Gillon et al. | |
| 2007/0136807 | A1* | 6/2007 | DeLiberato | G06F 21/55 726/22 |
| 2007/0271597 | A1* | 11/2007 | Venkatachalam | G06F 21/53 726/4 |
| 2010/0146582 | A1 | 6/2010 | Jaber et al. | |

(Continued)

OTHER PUBLICATIONS

Wikipedia, "BitLocker", Mar. 10, 2018, 8 pgs.

(Continued)

*Primary Examiner* — Teshome Hailu
(74) *Attorney, Agent, or Firm* — Egan, Enders & Huston LLP.

(57) ABSTRACT

An information handling system (IHS) includes a memory having a BIOS, at least one sensor that generates security related data for the IHS, a controller, and one or more I/O drivers. The memory, at least one sensor and controller operate within a secure environment of the IHS; the I/O driver(s) operate outside of the secure environment. The controller includes a security policy management engine, which is executable during runtime of the IHS to continuously monitor security related data generated by the at least one sensor, determine whether the security related data violates at least one security policy rule specified for the IHS, and provide a notification of security policy violation to the BIOS, if the security related data violates at least one security policy rule. The I/O driver(s) include a security enforcement engine, which is executable to receive the notification of security policy violation from the BIOS, and perform at least one security measure in response thereto.

23 Claims, 5 Drawing Sheets

(56) References Cited

U.S. PATENT DOCUMENTS

2013/0340081 A1* 12/2013 Sakthikumar ......... G06F 21/566
                                                        726/24
2019/0056999 A1* 2/2019 Foxworth ............... G06F 21/44
2019/0334952 A1* 10/2019 Dhoble .................. H04L 43/08

OTHER PUBLICATIONS

Lenovo, The Lenovo Thinkcentre M73z All-In-One, 2013, 4 pgs.
Microsoft Docs, "Control the Health of Windows 10-based Devices", Oct. 13, 2017, 44 pgs.
Enderle, Dell Data Guardian, "Making File Level Security User Friendly", May 1, 2017, 4 pgs.
Kay, IDG Contributor Network, "Dell Shifts Security Focus to Data Itself", May 16, 2017, 4 pgs.
Dell Data Guardian, "Protect, Control and Monitor Your Data Wherever It Goes", Apr. 2017, 2 pgs.
Technet, "Device Health Attestation", Oct. 2017, 9 pgs.
Lenovo, "New Thinkcentre M58p Models Support Microsoft Windows 7", Oct. 22, 2009, 17 pgs.
Lenovo, "Modern Technology for Modern Medicine", 2012, 20 pgs.
Lenovo, "Enterprise Capacity and Performance in a 2P/4U Tower", 2 pgs. ThinkSystem St550, 2017, 2 pgs.
Lenovo, "Why Lenovo ThinkSystem Servers Are the Best Choice for Security", Dec. 2017, 15 pgs.

\* cited by examiner

SECURITY POLICY ENFORCEMENT BASED ON DYNAMIC SECURITY CONTEXT UPDATES

FIELD

This invention relates generally to information handling systems, and more particularly, to security policy enforcement within information handling systems.

BACKGROUND

As the value and use of information continues to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

With the prevalence of information handling systems in today's society, and the increased connectivity between such systems, comes a need to enhance security within information handling devices. Without having security measures in place, there exists a potential for a user or system to gain access to computing resources of the IHS, to download data or program code to the IHS, and/or to offload data or program code stored within the IHS.

Security services or programs are often provided within the operating system (OS) of an information handling system to control access to computing resources, data and/or program code contained within the IRS. In general, OS level security services may grant access to computing resources, data and/or program code contained within an IHS based on authentication, identity and other security related context. Today, most security related context capture and authentication happens at machine boot or user login, and is not dynamic or continuous. This means that once an authorized user is permitted access to the IHS, the opportunities for an unauthorized user or system to gain access to computing resources within the IHS, or to offload data from/download data to the IHS, expand dramatically. In addition, because security related context is fairly easy to spoof at the OS level, unauthorized users or systems may use the spoofed security context to gain access to computing resources, data and/or program code within the IRS. A need, therefore, remains to strengthen the security posture of an IHS.

SUMMARY OF THE INVENTION

The following description of various embodiments of information handling systems and related methods is not to be construed in any way as limiting the subject matter of the appended claims.

According to one embodiment, an information handling system (IHS) in accordance with the present disclosure may include a memory having a basic input output system (BIOS), at least one sensor configured to generate security related data for the IHS, a controller coupled between the at least one sensor and the BIOS, and one or more input/output (I/O) drivers. The memory, the at least one sensor and the controller may be provided on a secure platform of the IHS, and therefore, may be configured for operating within a secure environment. The one or more I/O drivers may be provided within an operating system (OS) of the IHS, and therefore, may be configured to operate outside of the secure environment.

In some embodiments, the at least one sensor may be configured to generate security related data in response to detecting intrusion into a chassis of the IHS, detecting corruption of program code or data within the BIOS, detecting a GPS location of the NIS, determining a connection state of a USB port included within the NIS, determining a communication state of a network interface device included within the IHS, determining a power state of the IHS, and/or determining a docking state of the IHS. It is noted, however, the at least one sensor is not restricted to such examples, and may be configured to generate substantially any data that is relevant to system security.

In some embodiments, the controller may comprise a security policy management engine, which is executable during runtime of the IHS to continuously monitor the security related data generated by the at least one sensor, determine whether the security related data violates at least one security policy rule specified for the IHS, and provide a notification of security policy violation to the BIOS, if the security related data violates the at least one security policy rule. In some embodiments, a plurality of security policy rules specified for the IHS may be stored within the controller, or within the BIOS.

The one or more I/O drivers may include a security enforcement engine, which is executable to receive the notification of security policy violation from the BIOS over a secure communications channel. The security enforcement engine may be further executable to perform at least one security measure upon receiving the notification of security policy violation from the BIOS.

In some embodiments, the security enforcement engine may be configured to receive the notification of security policy violation immediately in response to the notification being provided to the BIOS. In other embodiments, the security enforcement engine may be configured to receive the notification of security policy violation from the BIOS in response to a security update request transmitted from at least one I/O driver to the BIOS over the secure communications channel. In some embodiments, the at least one I/O driver may transmit the security update request continuously or periodically during runtime of the IHS. In other embodiments, the at least one I/O driver may transmit the security update request in response to an event detected by the I/O driver. Examples of events that may prompt an I/O driver to transmit a security update request include, but are not limited to, a request to access or decrypt data stored within a storage medium of the IHS, and a request to communicate with the IHS via a network.

The security enforcement engine may perform one or more of an endless array of security measures upon receiving the notification of security policy violation for the BIOS. In some embodiments, for example, the security enforcement engine may destroy, encrypt or revoke access to a key, which is used by an I/O driver to decrypt encrypted data stored within a storage medium of the IHS, so that the encrypted data cannot be decrypted by the I/O driver. In other embodiments, the security enforcement engine may disable one or more input devices of the IHS, disable one or more output devices of the IHS, and/or disable at least one of a network interface, a device interface and an optical disc drive to block access to data stored within a storage medium of the IHS. Other security measures may also be performed by the security enforcement engine in response to receiving the notification of security policy violation for the BIOS.

According to another embodiment, an information handling system (IHS) in accordance with the present disclosure may include a memory having a basic input output system (BIOS), at least one sensor configured to generate security related data for the IHS, a controller coupled between the at least one sensor and the BIOS, and a filter driver. The memory, the at least one sensor and the controller may be provided on a secure platform of the IHS, and therefore, may be configured for operating within a secure environment. The filter driver may be provided within an operating system (OS) of the IHS, and therefore, may be configured to operate outside of the secure environment.

In some embodiments, the controller may comprise a security policy management engine, which is executable during runtime of the IHS to continuously monitor the security related data generated by the at least one sensor, determine whether the security related data violates at least one security policy rule specified for the IHS, and modify a security compliance state stored within the BIOS to reflect a security violation, if the security related data violates the at least one security policy rule.

In some embodiments, the filter driver may include a key management unit configured to store a key used to encrypt and decrypt data, an encryption/decryption unit configured to use the key to encrypt and decrypt data, and a security enforcement engine configured to allow or revoke access to the key based on the security compliance state stored within the BIOS. In particular, the security enforcement engine may be executable to access the security compliance state stored within the BIOS via a secure communications channel connecting the filter driver to the BIOS, and may revoke access to a key used to encrypt and decrypt data, if the security compliance state reflects a security violation. In some cases, the security enforcement engine may access the security compliance state stored within the BIOS continuously or periodically during runtime of the IHS. In other cases, the security enforcement engine may access the security compliance state stored within the BIOS in response to a request detected by the filter driver to access or decrypt data stored within a storage medium of the IHS.

If the security compliance state reflects a security violation, the security enforcement engine may revoke access to the key, in some embodiments of the present disclosure, by encrypting the key, thereby preventing the encryption/decryption unit of the filter driver from decrypting encrypted data stored within a storage medium of the IHS. In some embodiments, the security enforcement engine may encrypt the key using a public key obtained from a digital certificate, which was previously provided to the IHS by a certificate authority. In some embodiments, the security enforcement engine may be configured to send the encrypted key to a key recovery service for decryption with a private key, receive the decrypted key from the key recovery service, and store the decrypted key in the key management unit. Thereafter, the encryption/decryption unit may use the key to decrypt encrypted data stored within a storage medium of the IHS, if the security compliance state stored within the BIOS indicates that the system is secure.

BRIEF DESCRIPTION OF THE DRAWINGS

Other advantages of the present disclosure will become apparent upon reading the following detailed description and upon reference to the accompanying drawings in which.

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

Figure 1:
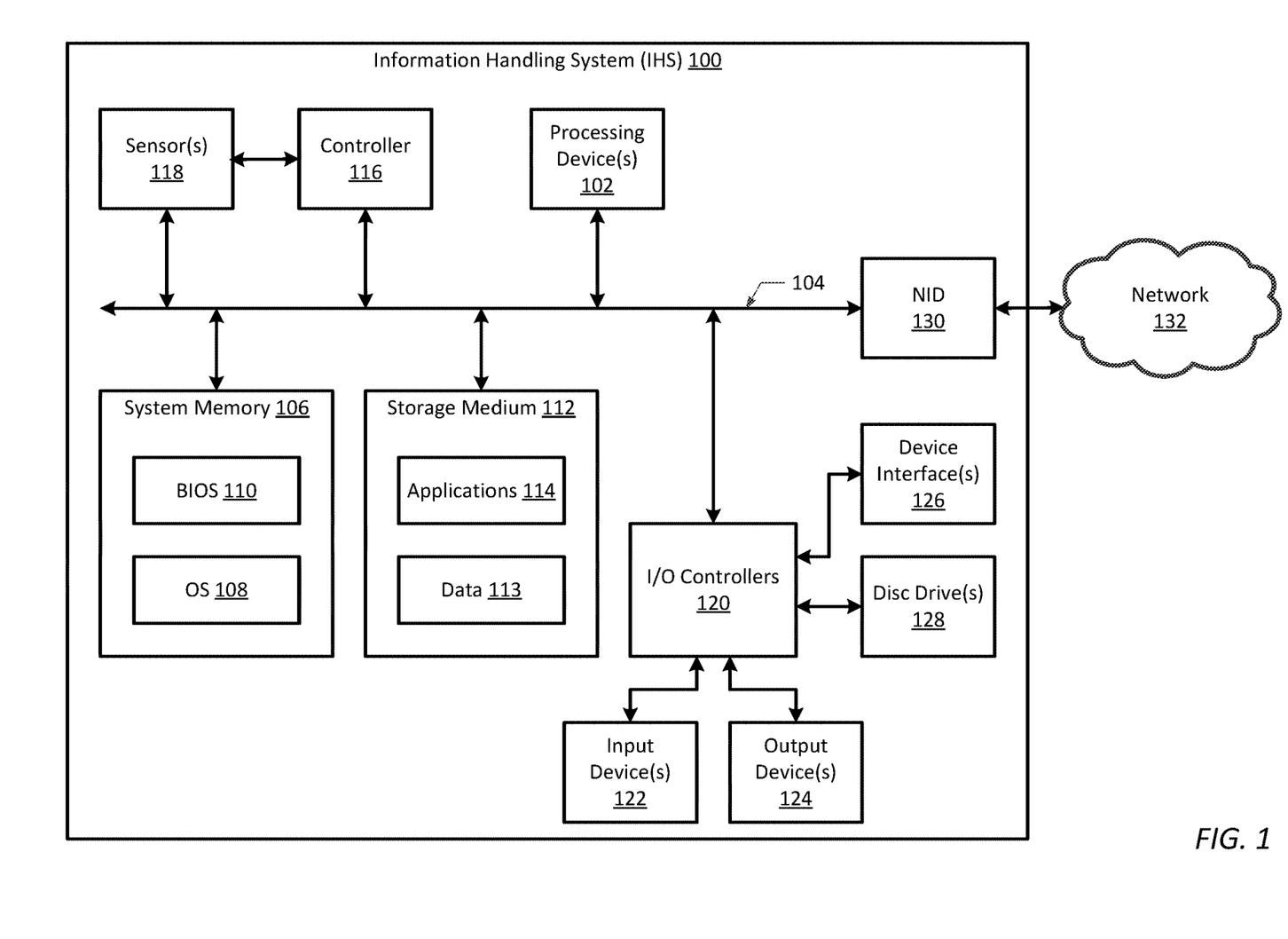
FIG. 1 is a block diagram illustrating an information handling system (IHS), according to one embodiment.

FIG. 1 is a block diagram of an information handling system 100 as it may be configured according to one embodiment of the present disclosure. In this regard, it will be understood that the configuration shown in FIG. 1 is exemplary only, and that the disclosed methods may be implemented on any type of information handling system. It will be further understood that while certain components of the information handling system are shown in FIG. 1 for illustrating embodiments of the present disclosure, the information handling system disclosed herein is not restricted to including only those components shown in FIG. 1 and described below.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may generally include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

Referring specifically to FIG. 1, information handling system (IHS) 100 includes one or more processing devices 102 coupled to system memory 106 via system interconnect 104. Other components of IHS 100, such as computer-readable storage medium 112, controller 116, one or more sensors 118, a plurality of input/output (I/O) controllers 120, and network interface device 130, may also be coupled to system interconnect 104 for communicating signals and data there between. The system interconnect 104 depicted in FIG. 1 may represent one or more buses, interfaces, hubs and/or controllers used to transfer information between the system components. Other components not specifically shown in FIG. 1 may also be included within the information handling system.

System memory 106 (e.g., RAM, ROM and/or cache memory) may be generally configured to store a plurality of software and/or firmware modules, including but not limited to, operating system (OS) 108 and Basic Input/Output System (BIOS) 110. The software and/or firmware modules stored within system memory 106 may generally contain program instructions (or computer program code), which may be executed by at least one of the processing device(s) 102 shown in FIG. 1 to instruct components of IHS 100 to perform various tasks and functions for the information handling system.

Computer readable storage medium 112 may be generally configured to store user data 113 and applications 114. Applications 114 may contain program instructions (or computer program code), which may be executed by at least one of the processing device(s) 102 shown in FIG. 1 to perform various tasks and functions for the information handling system and/or the user. According to one embodiment, computer readable storage medium 112 may comprise one or more hard disk drives (HDDs) or solid-state drives (SSDs).

In some embodiments, at least a subset of the data 113 may be encrypted to secure the data stored within computer readable storage medium 112. Substantially any cryptographic technique may be used to encrypt and enforce access control of the data 113 stored within storage medium 112. In some embodiments, a security service or data security program may use file, block or disk encryption techniques to secure at least a subset of the data 113. In one example, data 113 may be encrypted and decrypted by a filter driver included, e.g., with OS 108 (see FIG. 5). In some cases, the filter driver may use a key, which is generated at the time of provisioning, to decrypt encrypted data 113 stored within storage medium 112 during file or disk access. In some cases, the key may be escrowed to a remote server, system or USB drive for recovery in case the key should be lost, revoked or otherwise compromised.

The one or more processing devices 102 shown in FIG. 1 may be configured to execute the program instructions stored within system memory 106 and/or computer readable storage medium 112. Examples of processing device(s) 102 include various types of programmable integrated circuits (e.g., a processor such as a controller, microcontroller, microprocessor, ASIC, etc.) and programmable logic devices (such as a field programmable gate array "FPGA", complex programmable logic device "CPLD", etc.). According to one embodiment, processing device(s) 102 may include a central processing unit (CPU) 110 for executing the program instructions associated with OS 108, BIOS 110 and/or applications 114. CPU 110 may include any type of processing device, such as an Intel Pentium series processor, an Advanced Micro Devices (AMD) processor or another processing device. In some embodiments, processing device(s) 102 may include other types of processing devices including, but not limited to, a graphics processor unit (GPU), a graphics-derivative processor (such as a physics/gaming processor), a digital signal processor (DSP), etc.

The plurality of I/O controllers 120 may control communication of data and signals between components of IHS 100 and the input device(s) 122, output device(s) 124, device interface(s) 126 and/or disc drive(s) 128 shown in FIG. 1. For example, one or more I/O controller(s) 120 may be included within IHS 100 to provide a physical connection to, and process signals from, one or more input devices 122, such as a keyboard, mouse, touch screen, touch pad, microphone, etc. In addition, one or more I/O controller(s) 122 may be included to provide a physical connection, and forward output signals to, one or more output devices 124, such as a computer monitor, display device, audio speaker (s), etc. Furthermore, one or more I/O controller(s) 122 may be included to provide a physical connection to, and process signals to/from, one or more device interfaces 126 and/or optical disc drives 128. Examples of device interfaces 126 include, but are not limited to, a Universal Serial Bus (USB) interface, a card reader, a Personal Computer Memory Card International Association (PCMCIA) port, and a high-definition multimedia interface (HDMI). Examples of optical disc drives 128 include, but are not limited to, compact disc (CD) drives, digital video (DVD) disc drives and Blu-ray disc drives (BD).

Network interface device (NID) 130 enables IHS 100 to communicate with other devices, systems and/or services via an external network 132 using one or more communication protocols. Network 132 may be a local area network (LAN), wide area network (WAN), personal area network (PAN), or the like, and the connection to and/or between IHS 100 and network 132 may be wired, wireless or a combination thereof. For purposes of this discussion, network 132 is indicated as a single collective component for simplicity. However, it is appreciated that network 132 may comprise one or more direct connections to other devices, as well as a more complex set of interconnections as can exist within a wide area network, such as the Internet. Network interface device 130 may communicate data and signals to/from IHS 100 using any known communication protocol.

With the prevalence of information handling systems in today's society, and the increased connectivity between such systems, comes a need to enhance security within information handling devices. Without having security measures in place, there exists a potential for a user or system to gain access to computing resources of IHS 100, to download data or program code to IHS 100 via input devices 122, device interfaces 126, disc drives 128 or NID 130, and/or to offload data or program code stored within IHS 100 via output devices 124, data interfaces 126, optical disc drives 128 and/or NID 130.

Security services or programs are often provided within the OS to control access to computing resources, data and/or program code contained within the IHS. For example, an OS level security service may be provided to control data access by determining whether to allow decryption of encrypted data stored within the IHS. Other OS level security services may be included within the IHS to control file transfer, network access, etc.

OS level security services may grant access to computing resources, data and/or program code contained within an IHS based on authentication, identity and other security related context. Today, most security related context capture and authentication happens at machine boot or user login, and is not dynamic or continuous. This means that once an authorized user is permitted access to the IHS, the opportunities for an unauthorized user or system to gain access to computing resources within the IHS, or to offload data from/download data to the IHS, expand dramatically. In addition, because security related context is fairly easy to spoof at the OS level, unauthorized users or systems may use the spoofed security context to gain access to computing resources, data and/or program code within the IHS.

A need remains to strengthen the security posture of an IHS by moving the authentication, identity and other security related context capture and decision making into the secure platform of the IHS, and by providing dynamic security context updates from the secure platform to one or more OS level security services. This need is met, at least in part, by providing controller 116 and sensors 118 on the secure platform of the IHS, and by configuring the controller 116 to continuously determine and refresh the security posture of the secure platform based on security policy rules specified for the IHS and security related data provided by sensors 118.

Figure 2:
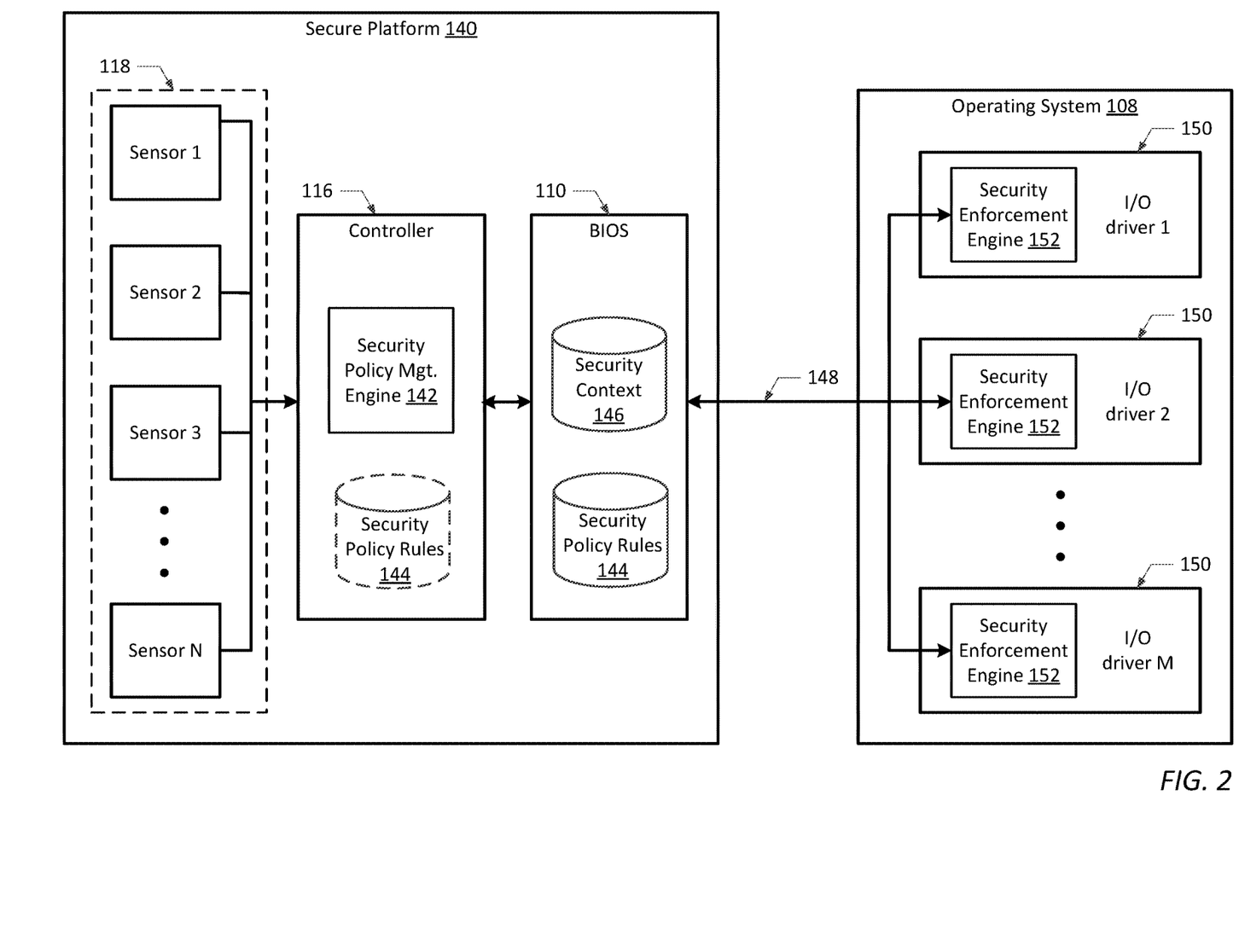
FIG. 2 is a block diagram showing additional details of an operating system (OS), Basic Input/Output System (BIOS), controller and sensors that may be included within an IHS, according to one embodiment.

FIG. 2 is a block diagram showing additional details of the OS 108, BIOS 110, controller 116 and sensors 118 included within IHS 100, according to one embodiment of the present disclosure. As shown in FIG. 2, controller 116, sensors 118 and BIOS 110 are provided on a secure platform 140 of IHS 100, and thus, are configured for operating in a secure environment. More specifically, secure platform 140 may provide controller 116, sensors 118 and BIOS 110 with a secure environment, which is resistant to security attacks and other modifications by isolating these components from other hardware and/or memory components of the IHS. In addition, controller 116 is directly connected (e.g., wired) to sensors 118 on the secure platform 140, and therefore, receives an unadulterated stream of sensor data from sensors 118 that cannot be changed or spoofed by malicious software.

In some embodiments, secure platform 140 may include a plurality of sensors 118 (e.g., sensors 1 . . . N), which are configured and coupled to provide security related data to controller 116. The sensors 118 may be implemented in hardware and/or software, and may be configured to provide substantially any data that is relevant to system security. As non-limiting examples, sensors 118 may be configured to detect intrusion into a chassis of the IHS, a connection state of a USB port included within the IHS (e.g., detecting the presence of an attached USB drive), a communication state of a network interface device included within the IHS (e.g., detecting network connectivity, or connection to a blacklisted network), physical location of the IHS (e.g., detecting a GPS location of the IHS), and/or a power state or docking state of the IHS. As further examples, sensors 118 may be configured to detect corruption of program code or data within the BIOS, a measured boot violation (e.g., detecting configuration and/or boot process changes to the IHS), multiple incorrect password attempts, state changes in the Trusted Platform Module (TPM), and/or other hardware-level abnormal behavior (e.g., an uncharacteristically large number of reads/writes to the same memory location). Other types of security related data not specifically mentioned herein may also be provided by sensors 118 to controller 116.

In general, controller 116 is coupled to receive security related data from sensors 118, and is configured to continuously determine and refresh the security posture of the secure platform 140 based on security policy rules specified for the IHS and the security related data provided by sensors 118. As shown in FIG. 2, controller 116 includes a security policy management engine 142, which is executable during runtime of the IHS to provide dynamic security context updates to BIOS 110 based on security policy rules 144 stored within BIOS 110 (or alternatively, within controller 116) and the security related data provided by sensors 118. Security policy management engine 142 may be implemented as software and/or firmware within controller 116, and may be configured to provide security context updates to BIOS 110 continuously as the security posture of the secure platform changes. The continual update or refresh of platform security posture represents a distinct advantage over conventional OS and platform level security services, which provide security related context capture and authentication only at machine boot or user login.

A security policy is a computer representation of at least one rule to be satisfied when a request is made for access to a computing resource. In some embodiments, one or more of the security policy rules may be used to control access to data stored within a computing resource of the IHS, and/or to control the decryption of encrypted data stored within a storage medium of the IHS.

Some security policy rules may be applied globally to all computing resources of an IHS. For example, a user may be required to enter a password when requesting access to an IHS, and a security policy rule may restrict access to all computing resources of the IHS, if an unauthorized password is detected. Other security policy rules may be applied to certain computing resources, certain classes of data and/or specific data elements. A class of data may be, e.g., a particular file type, a physical or logical storage type (e.g., data on a laptop drive, data on removable media, data transmitted across a public network), or a category of data defined explicitly (e.g., classified data, customer data, financial data, or engineering data). This classification may be specified within the data element, may be implicit, or may be specified by an external list, rule or other mechanism.

In some embodiments, a security policy may include one or more rules to be satisfied in the alternative, in conjunction, or by applying a more complex logical test (e.g., A and B or C but never D). In some embodiments, a security policy may include a global rule requiring all data to be encrypted prior to storage. In other embodiments, multiple security policies may specify different rules for different classes of data. For example, a security policy may specify that personal data is scrambled using a ROT13 algorithm to prevent inadvertent access, while corporate data is encrypted with one of two allowable encryption algorithms using an encryption key provided in part on a smart card or key fob, and in part by key server after proper authentication.

In some embodiments, a security policy rule may include temporal specifications to indicate when the policy should be enforced. In some embodiments, a security policy rule may specify one or more events, which trigger the enforcement of the security policy. The security policy rules 144 stored within BIOS 110 (or controller 116) may specify a variety of different trigger events, including but not limited to, a physical location of the IHS (e.g., an unauthorized GPS location), an unauthorized attempt to access the IHS (e.g., via chassis intrusion or an unauthorized attempt to access the IHS through an input device 122, device interface 126, disc drive 128, or NID 130), a change in power state or docking state of the IHS, an unexpected change of state, configuration of program code within the BIOS or TPM, an indication of compromised logs and/or other hardware-level abnormal behavior. These trigger events, and other trigger events not specifically mentioned herein, may be detected by security policy management engine 142 based on the security related data provided by one or more of the sensors 118. For instance, the security related data from sensors 118 indicate a condition, which may or may not trigger an event based on security policy rules 144. Upon detecting a trigger event, security policy management engine 142 may dynamically update or modify a security context 146 stored within (or at least accessible to) BIOS 110 based on the security related data and the security policy rules 144.

Figure 3:
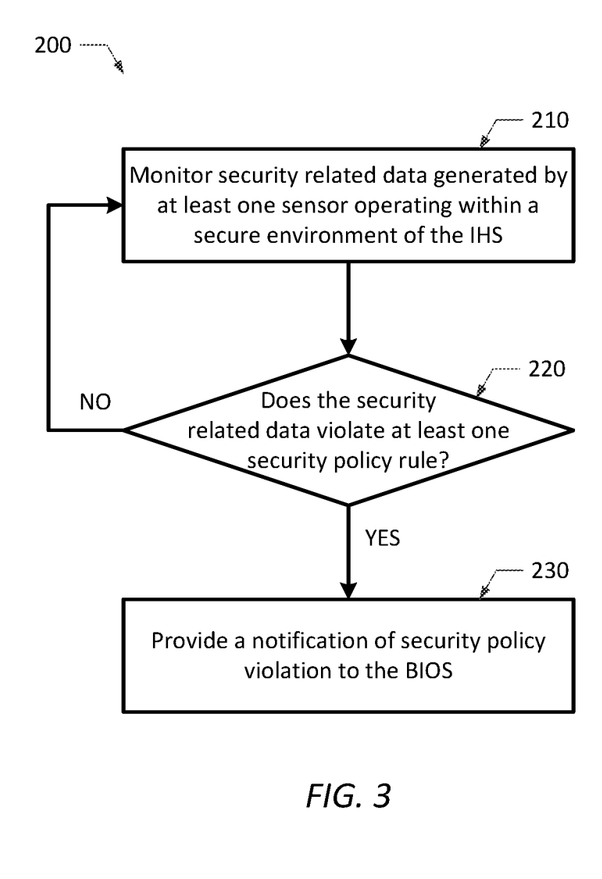
FIG. 3 is a flowchart diagram illustrating one embodiment of a method that may be used to provide dynamic security context updates to the BIOS of an IHS, according to one embodiment.

FIG. 3 is a flowchart diagram illustrating one embodiment of a method 200 that may be performed by security policy management engine 142 to provide dynamic security context updates to BIOS 110. As shown in FIG. 3, security policy management engine 142 may monitor the security related data generated by sensors 118 (in step 210), and determine whether the security related data violates at least one security policy rule specified for the IHS (in step 220). If the security related data does not violate any security policy rules (NO branch of step 220), the security policy management engine 142 may continue to monitor the security related data generated by sensors 118 (in step 210). If the security related data violates at least one security policy rule (YES branch of step 220), the security policy management engine 142 may provide a notification of the security policy violation to BIOS 110. In some embodiments, the notification of security policy violation may update or modify the security context 146 stored within (or at least accessible to) BIOS 110 to reflect a particular security policy violation. In other embodiments, the security context 146 may be updated or modified to reflect a change in a security compliance state (e.g., a state representing security compliance or non-compliance of the system as a whole).

Controller 116 may be generally implemented in hardware, software and/or firmware. In some embodiments, controller 116 may be an embedded controller (EC) or dedicated microcontroller, which is provided on secure platform 140 and configured to execute security policy management engine 142. In other embodiments, controller 116 may be replaced with a chipset status register or general purpose I/O (GPIO) pins, which are coupled to receive security related data from sensors 118. In such embodiments, security policy management engine 142 may be included within BIOS 110, or within a cloud-hosted data analytics entity coupled to the GPIO pins or BIOS 110. Regardless of where the security policy management engine 142 is implemented (e.g., controller 116, BIOS 110 or a cloud-hosted data analytics entity), the security policy management engine 142 is configured to provide dynamic security context updates to BIOS 110, as generally described above.

Returning to FIG. 2, OS 108 may include a plurality of input/output (I/O) drivers 150 (e.g., I/O drivers 1 . . . M) to control communication of data to/from the IHS, and/or to control the encryption/decryption of data contained within a storage medium of the IHS. Examples of I/O drivers 150 provided within OS 108 may generally include, but are not limited, device interface drivers (e.g., USB drivers, video drivers, etc.), network drivers (e.g., WAN, LAN, or PAN drivers), and encryption/decryption filter drivers. Although I/O drivers 150 operate outside of the secure environment provided by secure platform 140, I/O drivers 150 are coupled to receive security context 146 updates from BIOS 110 over a secure communications channel 148. In some embodiments, the secure communications channel 148 may be a secure, bi-directional pipe (e.g., a Transport Layer Security, TLS, pipe), which enables security context information to be conveyed synchronously or asynchronously, depending on I/O driver and/or security requirements. Upon receiving security context information from BIOS 110, one or more of the I/O drivers 150 provided within OS 108 may use the security context information to enforce security within the IHS by performing a security measure.

For example, the I/O drivers 150 shown in FIG. 2 may each include a security enforcement engine 152, which is executable to enforce security based on the security context 146 information specified within BIOS 110 and provided to I/O drivers 150 via secure communications channel 148. Security enforcement engine 152 may be implemented as software and/or firmware within I/O drivers 150, and may be configured to receive security context updates from BIOS 110 continuously as the security posture of the secure platform changes, periodically during runtime of the IHS, or in response to an event detected by at least one I/O driver.

Figure 4:
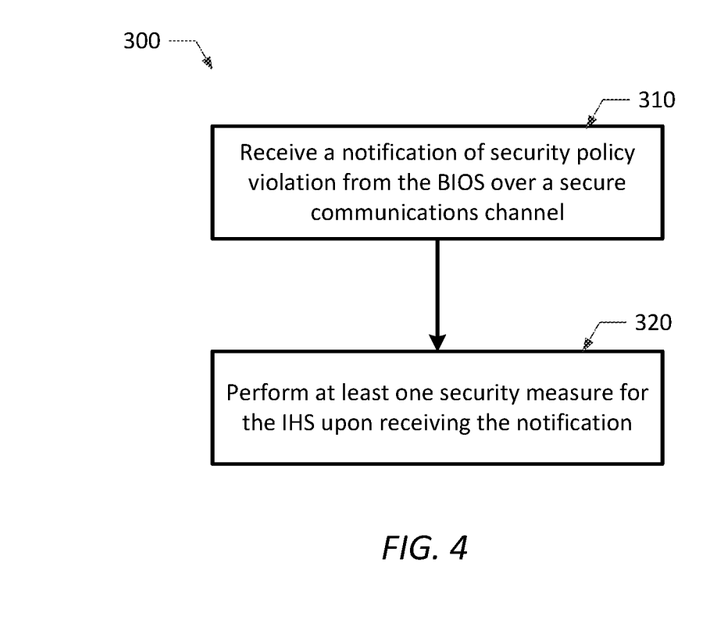
FIG. 4 is a flowchart diagram illustrating one embodiment of a method that may be used to enforce security within an IHS based on security context updates provided from the BIOS over a secure communications channel.

FIG. 4 is a flowchart diagram illustrating one embodiment of a method 300 that may be performed by security enforcement engine 152 to enforce security within the IHS based on security context updates provided from BIOS 110 over a secure communications channel 148. As shown in FIG. 4, security enforcement engine 152 may receive a notification of security policy violation from BIOS 110 over secure communications channel 148 (in step 310), and may perform at least one security measure upon receiving the notification of security policy violation (in step 320). As noted above, a security policy management engine 142 (e.g., within controller 116, BIOS 110 or a cloud-hosted data analytics entity) may provide a notification of security policy violation to the BIOS, if security related data from one or more sensors 118 violates at least one security policy rule.

In some embodiments, the security enforcement engine 152 within one or more I/O drivers 150 may be configured to receive a notification of security policy violation from BIOS 110 (in step 310) immediately in response to the notification being provided to BIOS 110. In such embodiments, the security enforcement engine(s) 152 may be configured to receive dynamic security posture updates from BIOS 110 as security posture changes occur. For instance, one or more security enforcement engines 152 within one or more I/O drivers 150 may subscribe, at the time of provisioning, to receive notifications of security policy violation from BIOS 110 as they occur.

In other embodiments, a particular security enforcement engine 152 may be configured to receive a notification of security policy violation from BIOS 110 (in step 310) in response to a security update request transmitted from a corresponding one of the I/O drivers 150 to BIOS 110 over the secure communications channel 148. In such embodiments, the particular security enforcement engine 152, or the corresponding I/O driver 150, may poll BIOS 110 to get security posture updates. The security update request may be transmitted continuously or periodically during runtime of the IHS, or in response to an event detected by the corresponding I/O driver. Examples of events that may cause a security update request to be transmitted include, but are not limited to, a request to access or decrypt data stored within a storage medium of the IHS, a request to communicate with the IHS via a network, a request received via mailbox (periodically checking to see if any messages have been given from outside resources to prompt the security update), a driver load or reload event, and a driver privilege or process ID change. Other events not specifically mentioned herein may also prompt a security enforcement engine 152 or a corresponding I/O driver 150 to transmit a security update request to BIOS 110.

The security enforcement engines 152 included within I/O drivers 150 may be configured to perform one or more of an endless array of security measures (in step 320) in response to receiving a notification of security policy violation. Examples of security measures that may be performed by the security enforcement engines 152 (in step 320) include, but are not limited to, disabling one or more input devices of the IHS (e.g., blocking input received from a keyboard, mouse, touch pad, touch screen, microphone, optical reader, etc.), disabling one or more output devices of the IHS (e.g., turning off a display), and/or disabling a network interface, device interface and/or optical disc drive to block access to computing resources and/or data stored within a storage medium of the IHS. Further examples of security measures that may be performed by the security enforcement engines 152 (in step 320) include destroying, encrypting or revoking access to a key, which is used by an I/O driver 150 to decrypt encrypted data stored within a storage medium of the IHS, so that the encrypted data cannot be decrypted by the I/O driver. Other security measures not specifically mentioned herein may also be taken by the security enforcement engines 152 to secure access to computing resources and/or data within IHS. The security measures taken by the security enforcement engines 152 may generally be dependent on the I/O driver and/or security requirements.

The system and methods shown in FIGS. 3-4 strengthen the security posture of the IHS by moving the authentication, identity and other security related context capture and decision making into the secure platform of the IHS, and by providing dynamic security context updates from the secure platform to one or more OS level security services. More specifically, the security posture is strengthened by providing controller 116 and sensors 118 on the secure platform of the IHS, and by providing the controller with a security policy management engine 142, which continuously determines and refreshes the security posture of the secure platform based on security policy rules specified for the IHS and security related data provided by sensors 118.

Some prior art systems provide both security management and enforcement at the secure platform level. One example of such as system is described in U.S. Pat. No. 9,038,130, which is entitled "Sensor Aware Security Policies with Embedded Controller Hardened Enforcement," and incorporated herein in its entirety. The '130 patent covers enforcement at the bare metal level only, and does not encompass OS level interactions. While this approach is beneficial in certain environments vs. certain threats to the system, it is a relatively "big hammer" and is not intended to be OS-friendly. For example, the embedded controller described in the '130 patent may simply power off the IHS under the OS if the security policy is violated. Unlike the system described in the '130, which enforces security at the platform level, the present disclosure provides security enforcement engine(s) 152 at the OS level (e.g., within I/O drivers 150) to enforce system security and perform security measure(s) based on the security context updates received from the secure platform. One advantage provided by the present disclosure is that the BIOS/hardware security context policies can more elegantly handle richer and more complex interfaces and logic decisions through the OS level security enforcement engine(s) 152. The addition of, and collaboration with, the driver stack enables much more complex enforcement capabilities.

Figure 5:
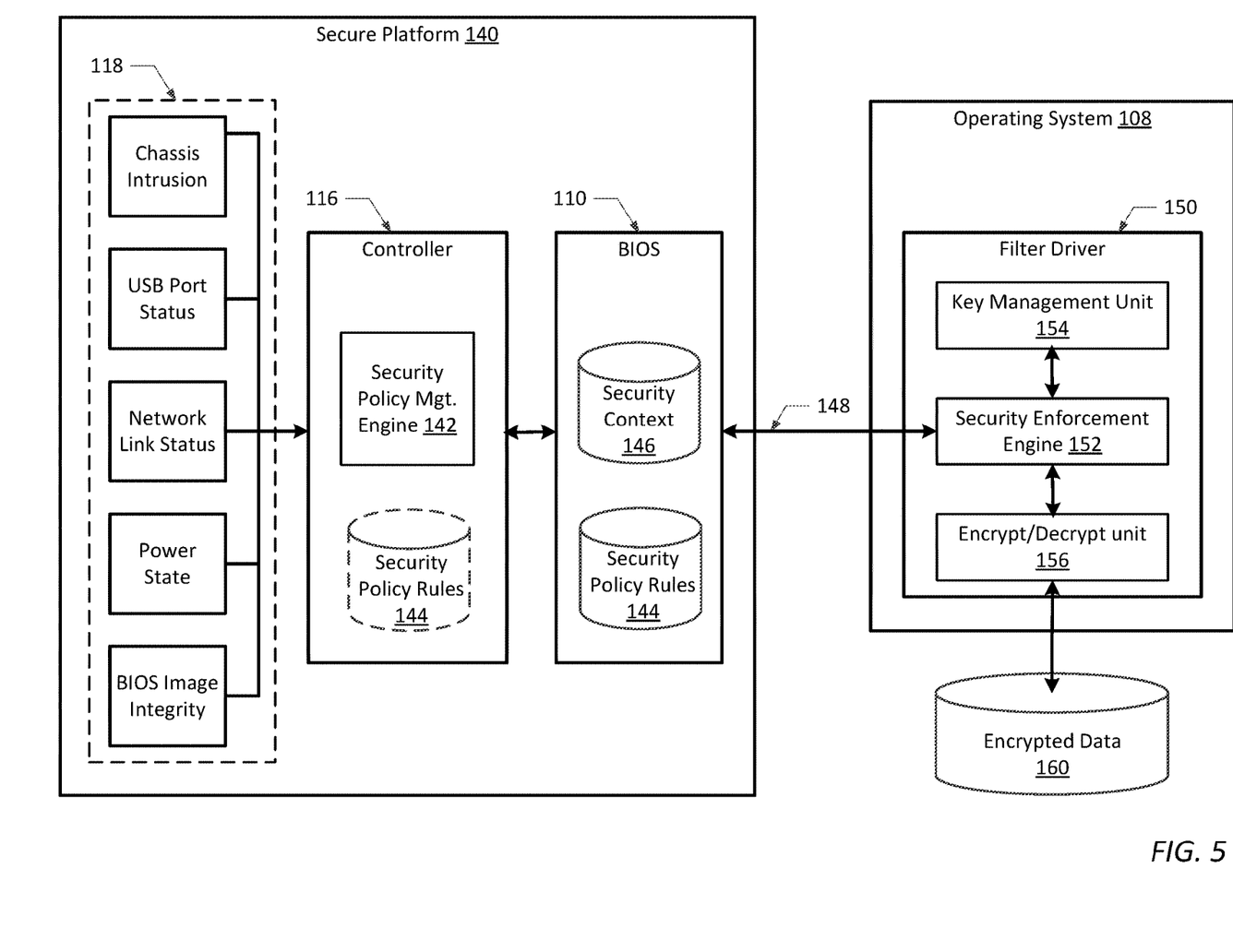
FIG. 5 is a block diagram showing additional details of an OS, BIOS, controller and sensors that may be included within an IHS, according to another embodiment.

FIG. 5 is a block diagram showing additional details of the OS 108, BIOS 110, controller 116 and sensors 118 included within IHS 100, according to another embodiment of the present disclosure. Many of the IHS components shown in the block diagram of FIG. 5 are similar to those shown in FIG. 2. For example, FIG. 5 illustrates controller 116, sensors 118 and BIOS 110 on secure platform 140 of IHS 100. Each of these components may be generally implemented as described above. Although an example set of sensors 118 are illustrated in the block diagram of FIG. 5 for detecting chassis intrusion, USB port status, network link status, power state and BIOS image integrity, the embodiment shown in FIG. 5 is not restricted to any number or type of sensor.

Compared to the more general embodiment shown in FIG. 2, FIG. 5 illustrates a more specific embodiment of the present disclosure in which a filter driver 150 uses security context 146 updates from BIOS 110 to control the encryption and decryption of data 160 stored within a storage medium of the IHS. As shown in FIG. 5, filter driver 150 includes a key management unit 154 and an encryption/decryption unit 156, each of which may be implemented as software and/or firmware within the filter driver. The key management unit 154 is generally configured to store one or more keys, which may be used to encrypt and decrypt data 160. The encryption/decryption unit 156 is generally configured to use the keys stored within key management unit 154 to encrypt and decrypt data 160. Encryption/decryption unit 156 may use substantially any cryptographic technique or algorithm for encrypting and decrypting data 160. The encrypted data 160 may be stored within any non-transitory tangible computer-readable media of IHS 100 including, but not limited to, the system memory 106 and storage medium 112 shown in FIG. 1.

In some cases, the keys stored within key management unit 154 may be generated at the time of provisioning. In some cases, the keys stored within key management unit 154 may be escrowed to a key recovery service (provided, e.g., within a remote server, system or USB drive), which enables the keys to be recovered should the keys be lost, revoked or otherwise compromised. In some cases, encryption/decryption unit 156 may use one of the keys stored within key management unit 154 to decrypt the encrypted data 160 during file or disk access.

In the embodiment shown in FIG. 5, filter driver 150 includes a security enforcement engine 152, which is coupled to receive security context 146 updates from BIOS 110 over a secure communications channel 148. Security enforcement engine 152 can be implemented as software and/or firmware within filter driver 150, and may be configured to receive security context 146 updates from BIOS 110 continuously as the security posture of the secure platform changes, periodically during runtime of the IHS, or in response to a request detected by filter driver 150 to access or decrypt the encrypted data 160. As noted above, the security context 146 stored within BIOS 110 may be modified or updated by a security policy management engine 142 (provided, e.g., within controller 116, BIOS 110 or a cloud-hosted data analytics entity) to reflect a particular security policy violation or a change in security compliance state (e.g., a state representing security compliance or non-compliance of the system as a whole).

Figure 6:
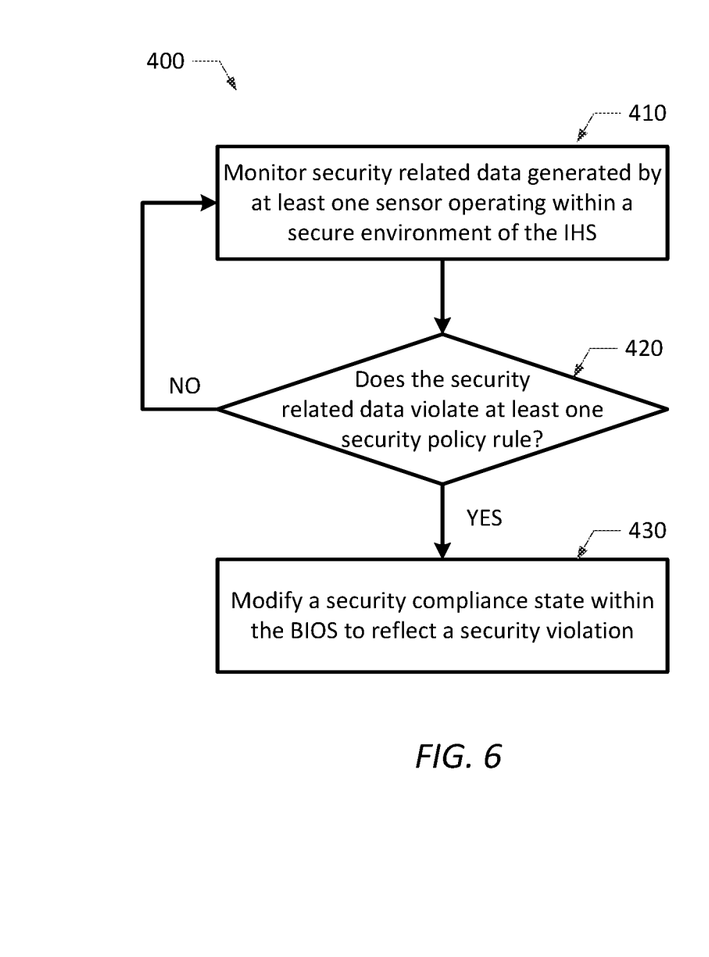
FIG. 6 is a flowchart diagram illustrating one embodiment of a method that may be used to modify a security compliance state of the BIOS to reflect a security policy violation.

FIG. 6 is a flowchart diagram illustrating one embodiment of a method 400 that may be performed by security policy management engine 142 to provide dynamic security context updates to BIOS 110. As shown in FIG. 6, security policy management engine 142 may monitor the security related data generated by sensors 118 (in step 410), and determine whether the security related data violates at least one security policy rule specified for the IHS (in step 420). If the security related data does not violate any security policy rules (NO branch of step 420), security policy management engine 142 may continue to monitor the security related data generated by sensors 118 (in step 410). If the security related data violates at least one security policy rule (YES branch of step 420), security policy management engine 142 may modify the security context 146 or change the security compliance state within BIOS 110 to reflect a security violation.

Figure 7:
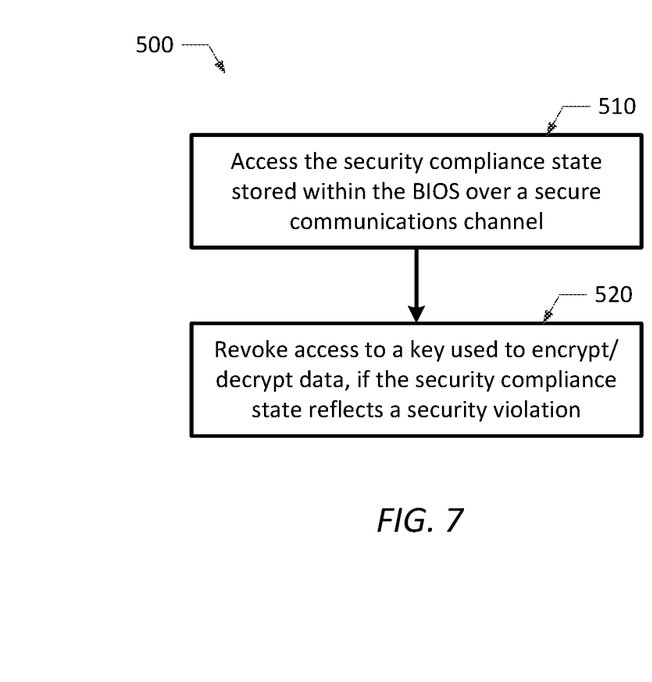
FIG. 7 is a flowchart diagram illustrating one embodiment of a method that may be used to revoke access to a decryption key based on the security compliance state of the BIOS.

FIG. 7 is a flowchart diagram illustrating one embodiment of a method 500 that may be performed by the security enforcement engine 152 within filter driver 150 to control the encryption/decryption of data 160 based on the security context updates provided from BIOS 110 over secure communications channel 148. As shown in FIG. 4, security enforcement engine 152 may be executable to access a security compliance state from BIOS 110 over a secure communications channel 148 (in step 510), and may revoke access to a key used to encrypt/decrypt data 160 if the security compliance state reflects a security violation (in step 520).

In some embodiments, security enforcement engine 152 may revoke access to the key by encrypting or wrapping the key. In one example, security enforcement engine 152 may encrypt the key using a public key obtained, for example, from a digital certificate provided to the IHS by a Certificate Authority during a provisioning phase. In other examples, security enforcement engine 152 may encrypt the key using alternative encryption methods. In either case, encrypting the key prohibits access to the encrypted data 160 by preventing encryption/decryption unit 156 from decrypting the encrypted data.

As noted above, the keys stored within key management unit 154 may be escrowed to a key recovery service (provided, e.g., within a remote server, system or USB drive), which enables the keys to be recovered should the keys be lost, revoked or otherwise compromised. In one example, the key recovery service may be an Endpoint Enterprise Security Suite provided by Dell Products, LP of Round Rock, Tex. Other key recovery services and solutions may also be used to provide a secure recovery mechanism for recovering escrowed keys.

After a user or administrator verifies their identity to the key recovery service and a secure session is established, security enforcement engine 152 may send the encrypted key to the key recovery service for decryption with a private key. In one example, the key recovery service may decrypt the encrypted key using a private key obtained from the digital certificate, which was provided to the IHS by the Certificate Authority during the provisioning phase. In some embodiments, one or more policy specific actions may take place before the encrypted key is decrypted. Examples of policy specific actions include, but are not limited, email, phone and/or text notifications of key recovery requests or rejected key recovery requests, question/answer sessions to verify identity of a user or administrator, and two factor authentication to establish a new key for decrypting the encrypted key. Once decrypted, the key recovery service may return the key to the IHS. Security enforcement engine 152 receives the key from the key recovery service and stores the key in key management unit 154. If the security compliance state stored within the BIOS indicates that the system is secure, security enforcement engine 152 may allow encryption/decryption unit 156 to use the key to access and decrypt the encrypted data 160.

It will be understood that one or more of the tasks, functions, or methodologies described herein may be implemented, for example, as firmware or as a computer program of instructions, which are embodied in a non-transitory tangible computer readable medium and executed by one or more processing devices. The computer program of instructions may generally include an ordered listing of executable instructions for implementing logical functions within the IHS, or within a component thereof. The executable instructions may include a plurality of code segments operable to instruct components of the information handling system to perform the methodologies disclosed herein. It will also be understood that one or more steps of the present methodologies may be employed in one or more code segments of a computer program. For example, a code segment executed by the information handling system may include one or more steps of the disclosed methodologies.

It will be understood that one or more processing devices may be configured to execute or otherwise be programmed with software, firmware, logic, and/or other program instructions, which are stored within one or more non-transitory tangible computer-readable mediums to perform the operations, tasks, functions, or actions described herein for the disclosed embodiments. The one or more processing devices may include, e.g., a central processing unit (CPU), controller, microcontroller, processor, microprocessor, field programmable gate array (FPGA), application specific integrated circuit (ASIC), or other suitable processing device. The one or more non-transitory tangible computer-readable mediums may include, e.g., data storage devices, flash memories, random update memories, read only memories, programmable memory devices, reprogrammable storage devices, hard drives, floppy disks, DVDs, CD-ROMs, and/or any other tangible data storage mediums.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus, the invention is not limited to only those combinations shown herein, but rather may include other combinations.

What is claimed is:
1. An information handling system (IHS), comprising:
a memory having a basic input output system (BIOS), which operates within a secure environment within the IHS;

at least one sensor, which operates within the secure environment to generate security related data for the IHS; and a controller, which operates within the secure environment, wherein the controller is distinct from, yet operatively coupled to the at least one sensor and the BIOS for communicating information securely there between, and wherein the controller comprises a security policy management engine, which is executable during runtime of the IHS to continuously:
- monitor the security related data generated by the at least one sensor;
- determine whether the security related data violates at least one security policy rule specified for the IHS, wherein if the security related data violates the at least one security policy rule, the security policy management engine is further executable to:
  - provide a notification of security policy violation to the BIOS; and
  - update security context information stored within the BIOS to reflect a particular security violation or a change in a security compliance state.

2. The information handling system as recited in claim 1, wherein a plurality of security policy rules specified for the IHS are stored within the BIOS or the controller.

3. The information handling system as recited in claim 1, wherein the at least one sensor is configured to generate security related data in response to at least one of the following:
- detecting intrusion into a chassis of the IHS;
- detecting corruption of program code or data within the BIOS;
- detecting a GPS location of the IHS;
- determining a connection state of a USB port included within the IHS;
- determining a communication state of a network interface device included within the IHS;
- determining a power state of the IHS; and
- determining a docking state of the IHS.

4. The information handling system as recited in claim 1, further comprising at least one input/output (I/O) driver, which operates outside of the secure environment and comprises a security enforcement engine that is executable to:
- receive the notification of security policy violation or the updated security context information from the BIOS over a secure communications channel; and
- perform at least one security measure upon receiving the notification of security policy violation or the updated security context information.

5. The information handling system as recited in claim 4, wherein the security enforcement engine is configured to receive the notification of security policy violation immediately in response to the notification being provided to the BIOS.

6. The information handling system as recited in claim 4, wherein the security enforcement engine is configured to receive the notification of security policy violation from the BIOS in response to a security update request transmitted from the at least one I/O driver to the BIOS over the secure communications channel.

7. The information handling system as recited in claim 6, wherein the at least one I/O driver transmits the security update request continuously or periodically during runtime of the IHS, or in response to an event detected by the at least one I/O driver.

8. The information handling system as recited in claim 7, wherein the event comprises at least one of the following:
- a request to access or decrypt data stored within a storage medium of the IHS; and
- a request to communicate with the IHS via a network.

9. The information handling system as recited in claim 4, wherein the at least one security measure performed by the security enforcement engine comprises destroying, encrypting or revoking access to a key, which is used by the I/O driver to decrypt encrypted data stored within a storage medium of the IHS, so that the encrypted data cannot be decrypted by the I/O driver.

10. The information handling system as recited in claim 4, wherein the at least one security measure performed by the security enforcement engine comprises one or more of the following:
- disabling one or more input devices of the IHS;
- disabling one or more output devices of the IHS; and
- disabling at least one of a network interface, a device interface and an optical disc drive to block access to data stored within a storage medium of the IHS.

11. The information handling system as recited in claim 1, wherein the BIOS, the at least one sensor and the controller are provided on a secure platform of the IHS, which isolates the BIOS, the at least one sensor and the controller from other IHS components and provides a secure environment that is resistant to security attacks.

12. The information handling system as recited in claim 11, wherein the controller is directly connected to the at least one sensor on the secure platform and configured to receive an unadulterated stream of security related data from the at least one sensor that cannot be changed by malicious software.

13. An information handling system (IHS), comprising:
- a memory having a basic input output system (BIOS), which operates within a secure environment within the IHS;
- at least one sensor, which operates within the secure environment to generate security related data for the IHS;
- a controller coupled between the at least one sensor and the BIOS, wherein the controller operates within the secure environment and comprises a security policy management engine, which is executable during runtime of the IHS to continuously:
  - monitor the security related data generated by the at least one sensor;
  - determine whether the security related data violates at least one security policy rule specified for the IHS; and
  - modify a security compliance state stored within the BIOS to reflect a security violation, if the security related data violates the at least one security policy rule; and
- a filter driver, which operates outside of the secure environment and comprises a security enforcement engine that is executable to:
  - access the security compliance state stored within the BIOS via a secure communications channel connecting the filter driver to the BIOS; and
  - revoke access to a key used to encrypt and decrypt data, if the security compliance state reflects a security violation.

14. The information handling system as recited in claim 13, wherein the filter driver further comprises:
- a key management unit configured to store the key used to encrypt and decrypt data; and
- an encryption/decryption unit configured to use the key to encrypt and decrypt data.

15. The information handling system as recited in claim 14, wherein if the security compliance state reflects a security violation, the security enforcement engine is configured to revoke access to the key by encrypting the key, thereby preventing the encryption/decryption unit from decrypting encrypted data stored within a storage medium of the IHS.

16. The information handling system as recited in claim 15, wherein the security enforcement engine is configured to encrypt the key using a public key obtained from a digital certificate provided to the IHS by a certificate authority.

17. The information handling system as recited in claim 16, wherein the security enforcement engine is configured to send the encrypted key to a key recovery service for decryption with a private key.

18. The information handling system as recited in claim 17, wherein the security enforcement engine is configured to receive the decrypted key from the key recovery service and configured to store the decrypted key in the key management unit.

19. The information handling system as recited in claim 13, wherein the security enforcement engine is configured to access the security compliance state stored within the BIOS continuously or periodically during runtime of the IHS.

20. The information handling system as recited in claim 13, wherein the security enforcement engine is configured to access the security compliance state stored within the BIOS in response to a request detected by the filter driver to access or decrypt data stored within a storage medium of the IHS.

21. A method to enforce security within an information handling system (IHS), the method comprising using a controller operating within a secure environment to:

monitor security related data generated by at least one sensor operating within a secure environment of the IHS;
determine whether the security related data violates at least one security policy rule specified for the IHS;
provide a notification of security policy violation to a basic input/output system (BIOS) of the IHS, if the security related data violates the at least one security policy rule; and
update security context information stored within the BIOS to reflect a particular security violation or a change in a security compliance state, if the security related data violates the at least one security policy rule;
wherein the controller is distinct from, yet operatively coupled to the at least one sensor and the BIOS for communicating information securely there between.

22. The method as recited in claim 21, further comprising receiving the notification of security policy violation from the BIOS over a secure communications channel; and
performing at least one security measure upon receiving the notification of security policy violation.

23. The method as recited in claim 22, wherein:
the steps of monitoring, determining, providing and updating are conducted by a security policy management engine operating within the secure environment of the IHS; and
the steps of receiving and performing are conducted by a security enforcement engine operating outside of the secure environment of the IHS.

* * * * *